US012594926B2

(12) United States Patent
Kharpuri et al.

(10) Patent No.: US 12,594,926 B2
(45) Date of Patent: Apr. 7, 2026

(54) SYSTEM AND METHOD FOR POWER ALLOCATION TO HIGH-VOLTAGE THERMAL LOADS FROM MULTIPLE ENERGY SOURCES IN A HYBRID POWERTRAIN DURING COLD CONDITIONS

(71) Applicant: FCA US LLC, Auburn Hills, MI (US)

(72) Inventors: Rudolf Kharpuri, Auburn Hills, MI (US); Venkatasubramanian Sankara Raman, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 104 days.

(21) Appl. No.: 18/442,439

(22) Filed: Feb. 15, 2024

(65) Prior Publication Data

US 2025/0263063 A1     Aug. 21, 2025

(51) Int. Cl.
*B60W 20/15* (2016.01)
*B60W 10/06* (2006.01)
*B60W 10/08* (2006.01)

(52) U.S. Cl.
CPC ............ *B60W 20/15* (2016.01); *B60W 10/06* (2013.01); *B60W 10/08* (2013.01); *B60W 2510/242* (2013.01)

(58) Field of Classification Search
CPC ...... B60W 20/15; B60W 10/06; B60W 10/08; B60W 2510/242
See application file for complete search history.

(56) References Cited

U.S. PATENT DOCUMENTS

2025/0196688 A1*  6/2025  Wang ..................... B60L 53/62

* cited by examiner

*Primary Examiner* — Brian P Sweeney
(74) *Attorney, Agent, or Firm* — Jeremy J. Klobucar

(57) ABSTRACT

A powertrain and control method that generates and transfers drive torque to a driveline of a hybrid electric vehicle is provided. The powertrain includes an internal combustion engine (ICE), at least one electric motor powered by a high-voltage battery, an integrated dual charge module (IDCM) and a controller. The controller is configured to: determine whether an external load is connected to the vehicle through the IDCM; determine an available engine-based power; determine whether the available engine-based power is above a threshold to support thermal loads; command power consumption from the high-voltage battery based on a determination that available engine-based power is not above the threshold; command power consumption from the ICE based on a determination that available engine-based power is above the threshold; and command a blending of power between the high-voltage battery and the ICE.

16 Claims, 5 Drawing Sheets

100

Time

T2

120

Engine coolant temp (degC)

Power to thermal (kW)

110

T1

114

Engine warm up time

Engine Speed (rpm)

6 degC

-27degC

12kW

7kW

0kW

*300*

*310*

Start

*314*
Did vehicle achieve start?

No

Yes

*324*
Is engine out of fuel?

*320*
Continue normal vehicle operation

Yes

No

*330*
Use HV battery power

*334*
Transition and blend engine power to HV battery power

*338*
Allocate power to thermal devices

*340*
End

SYSTEM AND METHOD FOR POWER ALLOCATION TO HIGH-VOLTAGE THERMAL LOADS FROM MULTIPLE ENERGY SOURCES IN A HYBRID POWERTRAIN DURING COLD CONDITIONS

FIELD

The present application generally relates to hybrid electric vehicles and, more particularly, to a system and method for allocating power from multiple energy sources during cold conditions.

BACKGROUND

A hybrid electric vehicle (HEV) is a type of hybrid vehicle that combines a conventional internal combustion engine system with an electric propulsion system. The engine in the HEV can be stopped and started multiple times during a drive cycle. The engine start-stop functionality in HEV's is a feature that automatically turns off the internal combustion engine when the vehicle comes to a stop, such as at traffic lights or in congested traffic, and restarting it when vehicle propulsion is needed again. Unlike a conventional 12 volt starter to crank the internal combustion engine, HEV's generally use high-voltage electric machines such a belt starter generator motor or integrated motors within a transmission to start the internal combustion engine.

In some HEV configurations, a power panel can be connected to a charge port of the HEV. An integrated dual charge module (IDCM) can use the energy from the high-voltage battery and engine to convert DC power to support AC loads connected to the power panel such as, but not limited to, power tools, appliances, computers and the like. It is generally difficult to observe and manage the selection of power source (battery or engine) while the HEV is supporting these external loads. Accordingly, while such HEV's do work well for their intended purpose, there is a desire for improvement in the relevant art.

SUMMARY

According to one example aspect of the invention, a powertrain that generates and transfers drive torque to a driveline of a hybrid electric vehicle is provided. The powertrain includes an internal combustion engine (ICE), at least one electric motor powered by a high-voltage battery, an integrated dual charge module (IDCM) and a controller. The controller is configured to: determine whether an external load is connected to the vehicle through the IDCM; determine an available engine-based power; determine whether the available engine-based power is above a threshold to support thermal loads; command power consumption from the high-voltage battery based on a determination that available engine-based power is not above the threshold; command power consumption from the ICE based on a determination that available engine-based power is above the threshold; and command a blending of power between the high-voltage battery and the ICE.

In some implementations, the controller is further configured to determine available engine-based power based upon a coolant temperature of the ICE.

In some implementations, the controller is further configured to determine available engine-based power based on a lookup table.

In some implementations, the controller is further configured to command power consumption from the ICE based on the determination that available engine-based power is above the threshold; and determine whether minimum power is active for a predetermined time.

In some implementations, the controller is further configured to command power consumption from the ICE based on a determination that the minimum power has been active for the predetermined time.

In additional aspects, the controller is further configured to determine whether fuel is out in the vehicle; and command power consumption from high-voltage battery based on a determination that the fuel is out in the vehicle.

In additional features, the controller is further configured to transition and blend power from the ICE to the high-voltage battery.

In other features, the powertrain further includes an electric air compressor (EAC) and an electric coolant heater (ECH), wherein the controller is further configured to allocate power to the EAC and the ECH.

According to one example aspect of the invention, a method for controlling a powertrain that generates and transfers drive torque to a driveline of a hybrid electric vehicle is provided. The powertrain includes an internal combustion engine (ICE), and at least one electric motor powered by a high-voltage battery, and an integrated dual charge module (IDCM). The method includes: determining, at a controller, whether an external load is connected to the vehicle through the IDCM; determining, at the controller, available engine-based power; determining, at the controller, whether available engine-based power is above a threshold to support thermal loads; commanding power consumption from high-voltage battery based on a determination that available engine-based power is not above the threshold; commanding power consumption from the ICE based on a determination that available engine-based power is above the threshold; and commanding a blending of power between the high-voltage battery and the ICE.

In additional features, the method includes determining the available engine-based power based upon a coolant temperature of the ICE.

In other features, determining the available engine-based power based on a lookup table.

In additional features, the method includes commanding power consumption from the ICE based on the determination that available engine-based power is above the threshold; and determining whether minimum power is active for a predetermined time.

According to other implementations, the method includes commanding power consumption from the ICE based on a determination that the minimum power has been active for the predetermined time.

In other features, the method includes determining whether fuel is out in the vehicle; and commanding power consumption from high-voltage battery based on a determination that the fuel is out in the vehicle.

In other features, the method includes transitioning and blending power from the ICE to the high-voltage battery.

In other features, the method includes allocating power to an electric air compressor (EAC) and an electric coolant heater (ECH).

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, in some HEV configurations, a power panel can be connected to a charge port of the HEV. An integrated dual charge module (IDCM) can use the energy from the high-voltage battery and engine to convert DC power to support AC loads connected to the power panel such as, but not limited to, power tools, appliances, computers and the like. It is generally difficult to observe and manage the selection of power source (battery or engine) while the HEV is supporting these external loads as HEV's typically do not have a human machine interface (HMI) dedicated to such task. In this regard, it is challenging to communicate details of vehicle behavior (status of operation, power consumption, time remaining, etc.) while the HEV is supporting such external loads. In some known prior art configurations, a user can select whether the engine can turn on or off as needed, or never to allow the engine to come on. In circumstances where the user has selected no engine operation, the sole energy source is the high-voltage battery.

The system and methods described herein determines power allocation (engine or battery) based on operating conditions such as engine coolant temperature and high-voltage load requirements. A control strategy determines when to switch to high-voltage battery power and transition back to engine power once available power is sufficient to meet the high-voltage load request. The control strategy also considers low fuel condition to default to high-voltage battery power.

Figure 1:
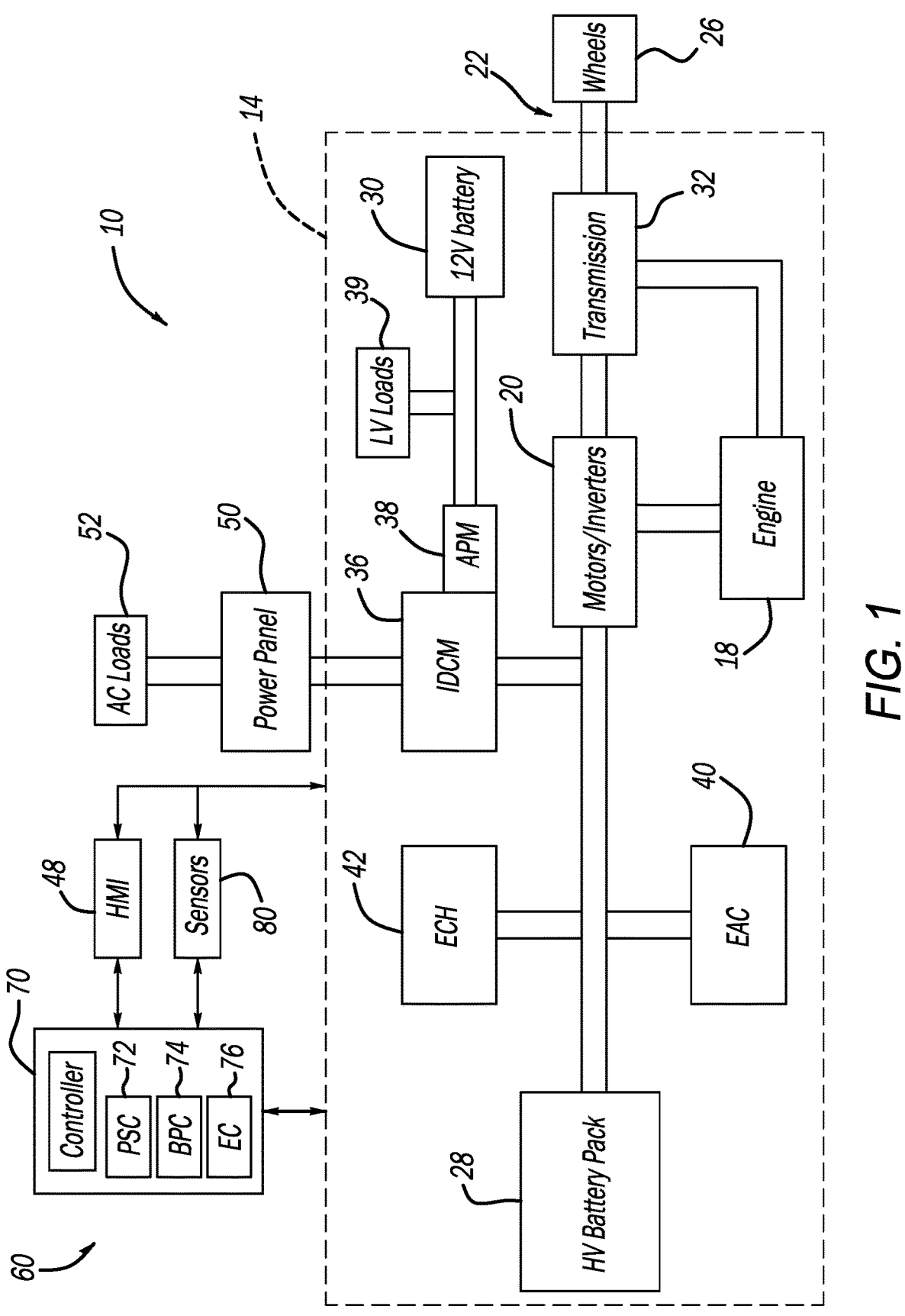
FIG. 1 is a schematic diagram of an exemplary HEV having a control system that allocates power from the internal combustion engine and the high-voltage battery based on operating conditions according to various principles of the present application.

Referring now to FIG. 1, a functional block diagram of an example HEV 10 (also referred to herein as "vehicle 10") according to the principles of the present application is illustrated. The vehicle 10 is a plug in hybrid electric vehicle and includes an electrified powertrain 14 generally having an internal combustion engine 18 and an electric motor 20. While one electric motor 20 is shown in the functional block diagram of FIG. 1, the vehicle 10 can have various configurations having various electric motors. The electrified powertrain 14 is configured to deliver drive torque from the engine 18, from the electric motor 20, or any combinations thereof, through a driveline 22 and to drive wheels 26. The electrified powertrain 14 can be configured to drive rear drive wheels through a first driven axle however, the electrified powertrain 14 can be configured to alternatively or additionally drive front drive wheels through a second driven axle. The electric motor(s) 20 are powered by a high-voltage battery pack 28 (e.g., such as a 16 kilowatt-hour (kWh) lithium-ion battery pack). A low-voltage battery 30 (e.g., 12 volt) can be disposed in the vehicle 10 that is generally configured to power low voltage components of the vehicle 10.

The electrified powertrain 14 includes a transmission 32. A clutch (not shown) selectively disengages an output of the engine 18 from a remainder of the electrified powertrain 14. In examples, the electric motor 20 can include a starting motor for the engine 18 or belt starter generator (BSG), connected to the engine 18 via a belt system. The electric motor 20 can also represent traction motors that can be used to deliver drive torque to the drive wheels 26 (such as during electric mode). As can be appreciated the electric motor 20 can be disposed at different positions in the powertrain 14. In general, the position of the motor(s) represents the type of hybrid architecture.

An integrated dual charge module (IDCM) 36 includes an auxiliary power module (APM) 38 that functions as a DC-DC converter. The IDCM 36 can convert AC to DC power during external charging from an electric vehicle supply equipment to charge the battery pack 28. The IDCM 26 can further convert DC to AC power to discharge from the battery pack 28 to support low voltage DC loads 39. In addition, the IDCM 26 can convert DC to DC power to charge and maintain the 12V battery 30.

Thermal devices in the vehicle 10 include an electric air compressor (EAC) 40 and an electric coolant heater (ECH) 42. The EAC 40 and the ECH 42 are used to condition (heat or cool) the vehicle and its components including the battery 28 and vehicle passenger components (cabin, windshield, etc.). A human machine interface (HMI) 48 can be used to interface with the vehicle. The HMI 48 can be an instrument cluster, an infotainment device, a heads-up display, a hand-held device (e.g., cellular phone) or any other device capable of communicating a message to a driver indicative of a drive state or other condition of the vehicle 10.

An off-board power panel 50 is a hybrid vehicle device that can be externally connected to a vehicle charge port by way of the IDCM 36 similar to a charger plug connected during external charging. The power panel 50 can provide 120V, 30A outlets to power AC loads 52 like power tools, cellular phones, computers and the like.

A control system 60 for controlling operation of the electrified powertrain 14 includes a controller 70 that provides various inputs to the electrified powertrain 14. The controller 70 is shown having a powertrain supervisory controller (PSC) 72, a battery pack controller (BPC) 74, and an engine controller (EC) 76. It is appreciated that the controller 70 can include additional distinct controllers. Furthermore, while the controllers 72, 74 and 76 are described as unique controllers, the controller 70 can be configured to provide all control functionality.

The PSC 72 can be referred to as a hybrid control processor and can supervise all controllers in the controller 70. The BPC 74 controls the high-voltage battery pack 28. The BPC 74 manages the high-voltage battery pack 28 and monitors measurements and parameters from sensors 80 including parameters such as state of charge (SOC), state of health (SOH), voltage, temperature, current and power limits of the high-voltage battery pack 28. The EC 76 controls the engine 18. The EC 76 manages and monitors measurements and parameters from sensors 80 including fuel level, engine coolant temperature, speed, torque, engine status (start, stop, running, fault, etc.). The information is communicated with the PSC 72 and collectively the EC 76 and PSC 72 can determine when to start and stop the engine 18 depending upon vehicle conditions. The IDCM 36 also communicates with the PSC 72 and provides information when an external connection is established and whether it is for charging or discharging purposes.

Figure 2:
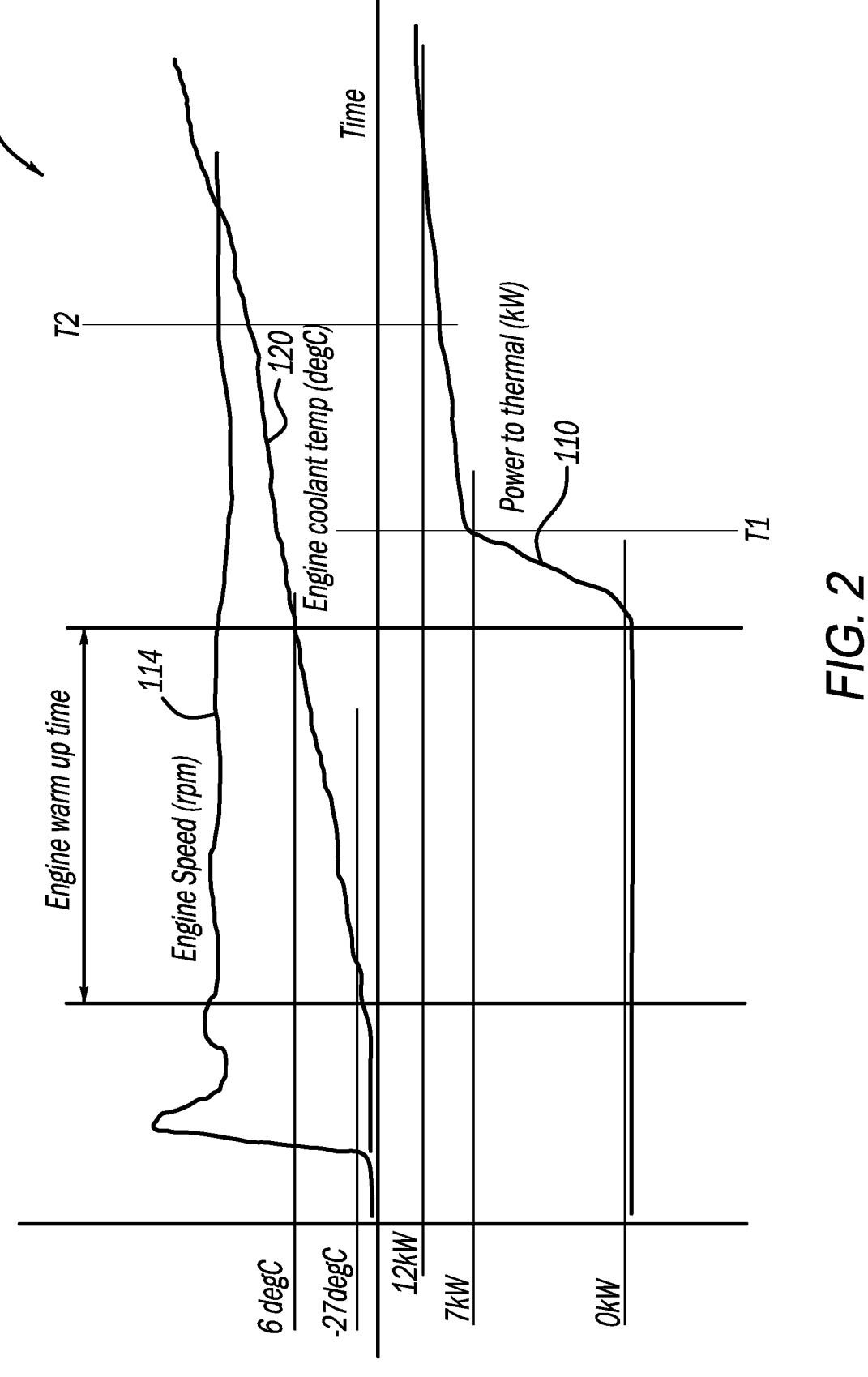
FIG. 2 is a plot illustrating coolant temperature for the internal combustion engine versus power according to various principles of the present application.

With reference now to FIG. 2, a plot 100 illustrating coolant temperature (for the engine 18) versus power is shown. In particular, the plot 100 illustrates the relationship between engine power 110, engine speed 114 and engine coolant temperature 120 over time is shown. In particular, access to engine power 110 is restricted based on coolant temperature 120. In other words, under cold conditions, the operation of the engine 18 is constrained until the engine 18 can overcome the cold surroundings and produce steady power without the risk of stalling (which can occur at idle speed coupled with high load).

Figure 3:
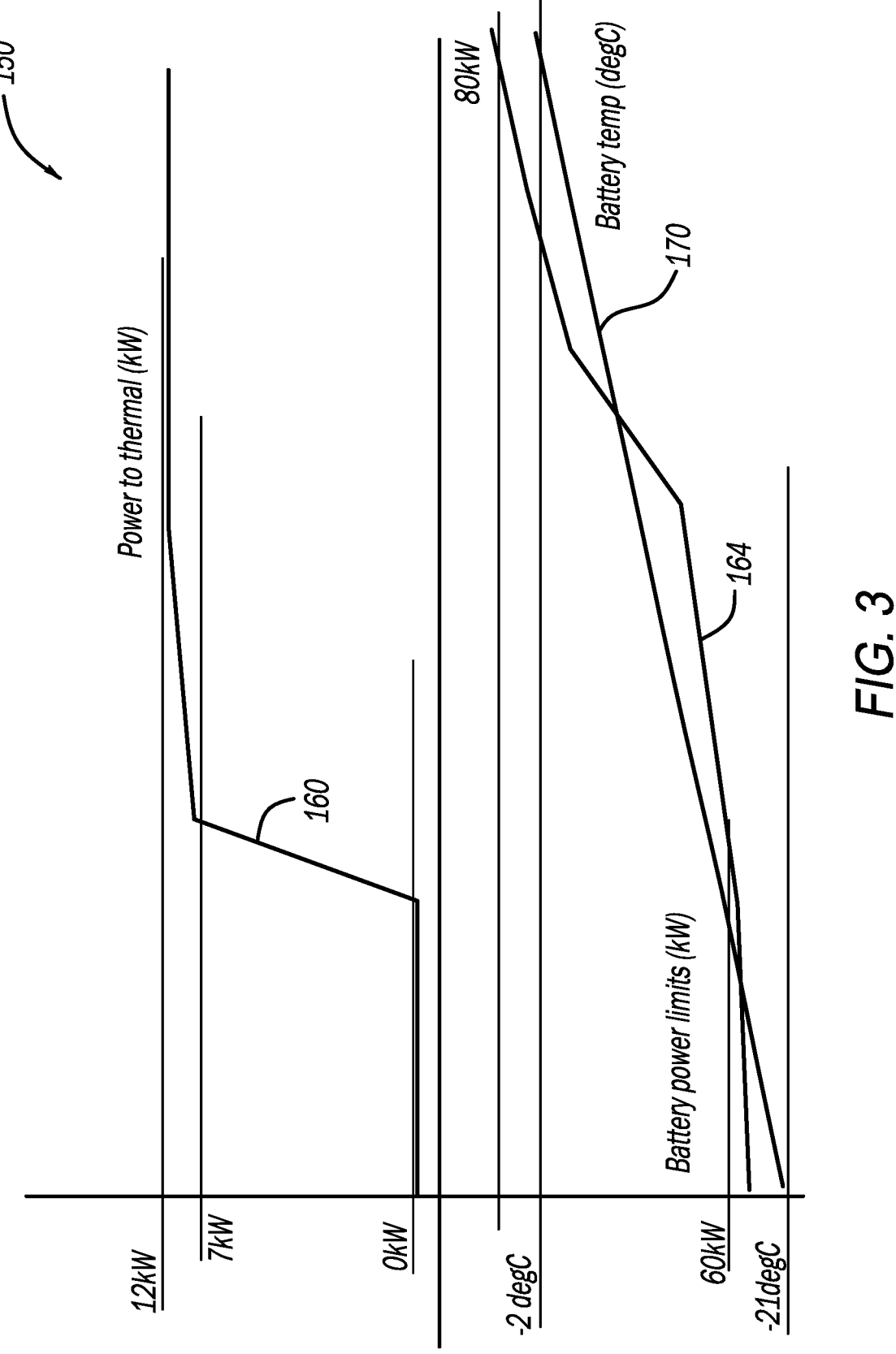
FIG. 3 is a plot illustrating battery temperature versus power limits according to various principles of the present application.

With reference now to FIG. 3, a plot 150 illustrating battery temperature versus power limits. In particular, the plot 150 illustrates power available to thermal 160, battery power limits 164 and battery temperature 170. In general, as battery temperature 170 rises, so too does the battery power limit 164. The power available to thermal 160 represents the power available for components such as the EAC 40 and ECH 42. Again, as temperature rises in the battery 28, so too does the available power.

In a cold operating scenario example of –21 degrees Celsius, where power limits from the high-voltage battery pack 28 are sufficient to run thermal loads (such as, for example, 5 kW) but may not be sufficient to sustain power to the remainder of the powertrain 14, the thermal devices 40, 42 can consume this power to condition the high-voltage battery pack 28 which in turn will open up the battery power limits. The temperature of the high-voltage battery pack 28 rises, which means the vehicle 10 can utilize more battery power as the high-voltage battery pack 28 warms up. In this regard, under conditions where the power panel 50 is connected and the operating conditions are cold, the engine 18 cannot run effectively to provide power to the power panel 50. As a result, the HV loads like thermal will not have any access to power to support conditioning in the vehicle 10.

Another example where existing prior art controls simplistic design does not provide access to HV battery power is during cold conditions when the engine 18 has an out of fuel event or transitions to an out of fuel scenario. The engine coolant temperature based power does not work even though conditions are good for the engine 18 to start. If the HV battery 28 has enough state of charge to propel the vehicle 10, cold conditions could mean that the windshield is icy and defrost functionality will not be available since there is no access to HV power for thermal loads (EAC 40, ECH 42, etc.), which is undesirable.

Figure 4:
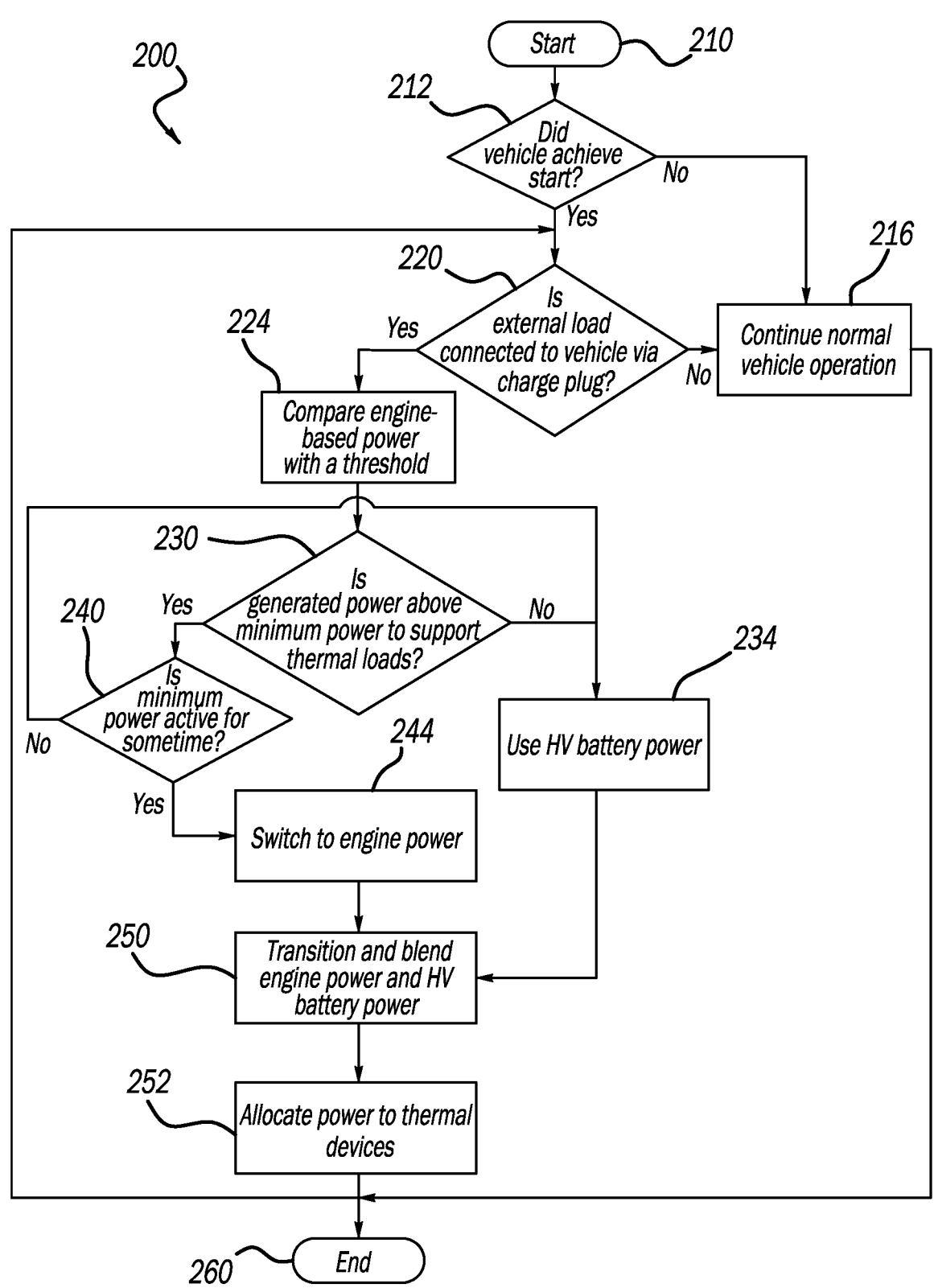
FIG. 4 is a logic flow diagram illustrating a method for operating the control system of FIG. 1 according to various principles of the present application.

With additional reference now to FIG. 4, a method for operating the control system of FIG. 1 according to examples of the present disclosure is shown and generally identified at reference numeral 200. The method starts at 210. At 212 control determines whether the vehicle 10 has started (for example, engine 18 has started and/or the vehicle 10 is in an operating state). If not, control continues normal vehicle operation at 216. If the vehicle 10 has started at 212, control determines whether there is an external load 52 connected to the vehicle 10 via the power panel or charge plug 50. If yes, control compares engine based power to a threshold at 224.

In examples, control compares the power that can be expected out of the engine 18 based on engine coolant temperature to a minimum power required to operate high-voltage loads such as thermal devices at 230. In examples, the temperature-based engine power can be a look up table where below a certain temperature, there is no power available, i.e., 0 KW. Explained further, only when the engine 18 runs for some amount of time with the engine coolant temperature rise to a point where engine power (to support thermal loads) will slowly increase and reach a state where it is sufficient to support the thermal loads. The engine based power and threshold can be in the form of a lookup table.

If the generated power is not above minimum power to support thermal loads at 230, control uses high-voltage battery power 234. If the generated power is above minimum power to support thermal loads at 230, control determines whether minimum power is active for a period of time at 240. Explained further, once the engine power meets the minimum threshold, there is a wait time to allow the engine 18 to ramp (warm) up to a state where the power produced is steady. If yes, control switches to engine power at 244. If no, control loops to 234. At 250, control transitions and blends engine power and high-voltage battery power. At 252 control allocates power to thermal devices (such as the EAC 40 and ECH 42). Control ends at 260. The techniques disclosed herein ensures a smooth transition occurs between high-voltage battery power and engine power (or vice-versa) to avoid sudden loss (or jump) of power.

Figure 5:
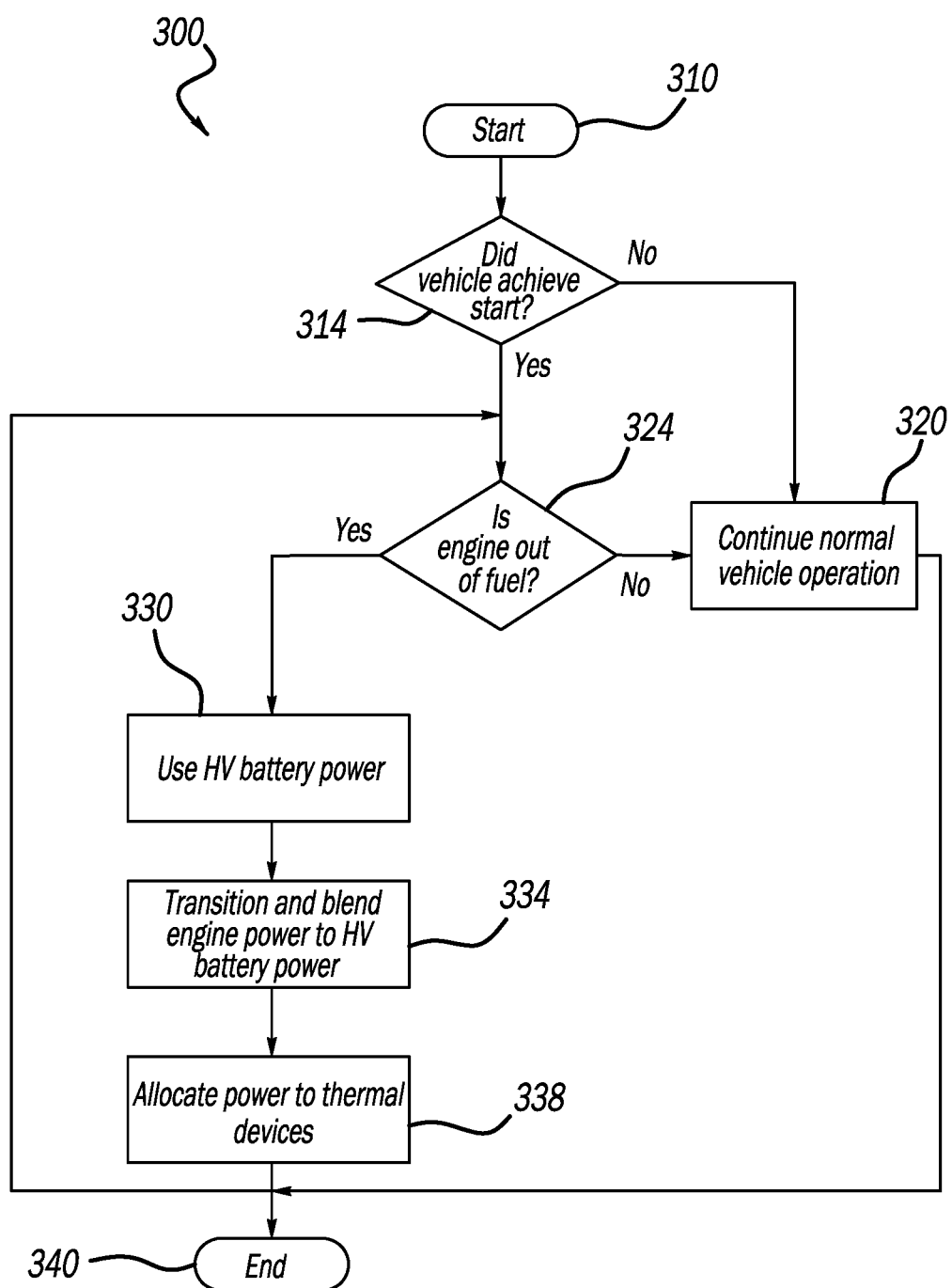
FIG. 5 is a logic flow diagram illustrating a method for operating the control system of FIG. 1 according to other features of the present application.

With additional reference now to FIG. 5, a method 300 for determining an out of fuel condition and transitioning smoothly from engine power to high-voltage power will be described. The method 300 starts at 310. At 314 control determines whether the vehicle 10 is started. If not, control continues normal vehicle operation at 320. If yes, control determines whether the engine 18 is out of fuel at 324. If not, control proceeds to 320. If yes, control uses high-voltage battery power at 330. At 334, control transitions and blends engine power and high-voltage battery power. At 338 control allocates power to thermal devices. Control ends at 340.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A powertrain that generates and transfers drive torque to a driveline of a hybrid electric vehicle, the powertrain comprising:

an internal combustion engine (ICE);

at least one electric motor powered by a high-voltage battery;

an integrated dual charge module (IDCM); and a controller that controls operation of the powertrain based on operating conditions, wherein the controller is configured to:

determine whether an external load is connected to the vehicle through the IDCM;

determine an available engine-based power;

determine whether the available engine-based power is above a threshold to support thermal loads;

command power consumption from the high-voltage battery based on a determination that available engine-based power is not above the threshold;

command power consumption from the ICE based on a determination that available engine-based power is above the threshold; and transition to command a blending of power between the high-voltage battery and the ICE.

2. The powertrain of claim 1, wherein the controller is further configured to:

determine available engine-based power based upon a coolant temperature of the ICE.

3. The powertrain of claim 2, wherein the controller is further configured to:

determine available engine-based power based on a lookup table.

4. The powertrain of claim 1, wherein the controller is further configured to:

command power consumption from the ICE based on the determination that available engine-based power is above the threshold; and determine whether minimum power is active for a pre-determined time.

5. The powertrain of claim 1, wherein the controller is further configured to command power consumption from the ICE based on a determination that the minimum power has been active for the predetermined time.

6. The powertrain of claim 5, wherein the controller is further configured to:

determine whether fuel is out in the vehicle; and command power consumption from high-voltage battery based on a determination that the fuel is out in the vehicle.

7. The powertrain of claim 6, wherein the controller is further configured to:

transition and blend power from the ICE to the high-voltage battery.

8. The powertrain of claim 1, further comprising:

an electric air compressor (EAC);

an electric coolant heater (ECH); and wherein the controller is further configured to allocate power to the EAC and ECH.

9. A method for controlling a powertrain that generates and transfers drive torque to a driveline of a hybrid electric vehicle, the powertrain including an internal combustion engine (ICE), and at least one electric motor powered by a high-voltage battery, and an integrated dual charge module (IDCM), the method comprising:

determining, at a controller, whether an external load is connected to the vehicle through the IDCM;

determining, at the controller, an available engine-based power;

determining, at the controller, whether the available engine-based power is above a threshold to support thermal loads;

commanding power consumption from the high-voltage battery based on a determination that available engine-based power is not above the threshold;

commanding power consumption from the ICE based on a determination that available engine-based power is above the threshold; and transition to commanding a blending of power between the high-voltage battery and the ICE.

10. The method of claim 9, further comprising:

determining the available engine-based power based upon a coolant temperature of the ICE.

11. The method of claim 10, further comprising:

determining the available engine-based power based on a lookup table.

12. The method of claim 9, further comprising:

commanding power consumption from the ICE based on the determination that available engine-based power is above the threshold; and determining whether minimum power is active for a predetermined time.

13. The method of claim 9, further comprising:

commanding power consumption from the ICE based on a determination that the minimum power has been active for the predetermined time.

14. The method of claim 13, further comprising:

determining whether fuel is out in the vehicle; and commanding power consumption from high-voltage battery based on a determination that the fuel is out in the vehicle.

15. The method of claim 14, further comprising:

transitioning and blending power from the ICE to the high-voltage battery.

16. The method of claim 9, further comprising:

allocating power to an electric air compressor (EAC) and an electric coolant heater (ECH).

* * * * *